United States Patent [19]
Magyar, Jr. et al.

[11] Patent Number: 5,469,249
[45] Date of Patent: Nov. 21, 1995

[54] PHOTOSENSITIVE PROBES

[76] Inventors: Peter F. Magyar, Jr., deceased, late of Port Huron, Mich.; Sheila Magyar, legal representative, 2713 Montego, Lansing, Mich. 48912

[21] Appl. No.: 245,104

[22] Filed: May 17, 1994

Related U.S. Application Data

[63] Continuation of Ser. No. 420,419, Oct. 12, 1989, Pat. No. 5,313,260.

[51] Int. Cl.$^6$ ............................. G01C 3/08; G01B 11/24
[52] U.S. Cl. ............................................ 356/4.07; 356/376
[58] Field of Search .................................... 356/1, 4, 376, 356/4.07; 250/231.1

[56] References Cited

U.S. PATENT DOCUMENTS

| | | |
|---|---|---|
| 3,583,299 | 6/1971 | Land . |
| 3,792,928 | 2/1974 | Poilleux . |
| 4,373,804 | 2/1983 | Pryor et al. . |

Primary Examiner—Stephen C. Buczinski
Attorney, Agent, or Firm—Dykema Gossett

[57] ABSTRACT

Probes according to the present invention practice a method of emitting light when the probe is positioned within a predetermined range of a workpiece surface, positioning the probe at a fixed position within the predetermined range of said workpiece, variably shaping the beam in response to variations of the relative distance between the probe and the workpiece within the predetermined range, and sensing a predetermined portion of the shaped beam when the workpiece surface is positioned at a point within the predetermined range, whereby the illumination intensity sensed varies substantially linearly throughout the predetermined range. In a non-contact form of the probe, the illumination is directed to vary the area of the light reflected from the workpiece surface in order to change illumination intensity at the sensor. In a contact form of the invention, a shade between a light source and a photosensitive receiver is displaced in response to plunger movement as the plunger engages the workpiece.

10 Claims, 5 Drawing Sheets

PHOTOSENSITIVE PROBES

RELATED APPLICATIONS

This application is a continuation of U.S. application Ser. No. 07/420,419 filed Oct. 12, 1989, now U.S. Pat. No. 5,313,260 i sued May 17, 1994.

I. BACKGROUND

A. Technical Field

The present invention relates generally to measurement and testing and, more particularly, to a method and apparatus for sensing dimensional or position measurements in response to light intensity directed toward a photosensitive cell.

B. Background Art

Previously known method and apparatus used for sensing dimensional conformity of workpieces in industrial environments have been available for quality control, but only at great cost to the manufacturers. Dimensional inspection and testing of manufactured component parts ha been accomplished by removing the component during various stages of manufacturing on a sampling basis and checking it dimensionally using a specialized checking fixture and in some instances a coordinate measuring machine. More recently, inspection and testing is desired in the production line, and by checking the component at various stages within the manufacturing process, each piece produced can be tested. In both cases, industrial probes also known as gauges are used in conjunction with the work holding device to accomplish the measurement.

For the most part, the previous probes were typically contact probes in the form of dial type indicators. Such indicators employ a spring-loaded stylus which is displaced through a measuring range by engagement with the workpiece and accordingly, moves a dial indicator as the part is engaged by the stylus. Alternatively, movement of the stylus relative to the probe housing may produce an electrical or electromagnetic reaction. For example, electrical resistance varies with movement of the stylus in U.S. Pat. No. 4,651,623.

More recent developments have sought to incorporate machine version or other non-contact probes to check workpieces during the production process. However, the known photo-optical technology requires complex light focusing sources as well as complex arrays of sensors and computer software to analyze the numerous sensor signals. These gauging systems may employ optical sensors which are known to provide an output directly corresponding to changes in the illumination intensity impinging upon the sensor, such as photovoltaic cells. However, the previously known applications involve complex optical circuits and, despite the complexity and expense of the circuitry and system, may often have a very limited utility in manufacturing.

Non-contact probes have also been known to generate changes in a magnetic field resulting from the proximity of a workpiece to a probe housing. However, these changes are not well-suited to an industrial environment because numerous environmental equipment and the workpieces themselves may influence the magnetic fields and interfere with accurate electromagnetic responses.

In today's manufacturing environment, both the contact and the non-contact probes must feed back analog or digital data to an analyzer or computer.

Defensive publication 702,459 and U.S. Pat. No. 3,005,916 disclose apparatus for photoelectrically scanning moving surfaces to detect the presence of irregular surface configurations in the form of protrusions or indentations on a planar surface. Numerous components are required to particularly focus a light source from one predetermined direction and receive the reflected light from another direction. However, both the aligned source and receptor create shadows which occur only when the workpiece surface is at a particular distance from the focusing apparatus. The device would be inoperable if the distance to the workpiece changed, and the system response is unrelated to the measurement of distance from the sensor.

U.S. Pat. No. 3,591,291 discloses a surface roughness detector in which a light beam from a source is collimated by appropriate lenses to direct the beam against the surface to be tested. The sensor housing is engaged against the workpiece surface so that reflections can be detected by a series of discretely positioned light sensitive element arranged at different predetermined angles within the housing. Any variation of the distance between the sensor housing and the workpiece interferes with the illumination intensity reflected to the light sensitive elements. As a result, the apparatus is not adapted to measure distances between the sensor and the workpiece.

U.S. Pat. No. 3,571,579 also discloses a previously known device for detecting irregularities in the surface of a workpiece. However, the irregularities are detected by a stylus which engages the workpiece and reacts to movement of the workpiece. Such contact with the workpiece and relative movement between the stylus and the workpiece can cause damage to the surface. The stylus movement is used to generate signals representative of the irregularities which can be optically stored by recreation on a storage medium such as a film strip or magnetic tape. The film strip recording is then examined by a plurality of photosensitive devices to determine the signal characteristics generated and for subsequent analysis.

Apparatus using photosensitive devices used to detect dimensional characteristics are extremely complicated. For example, U.S. Pat. No. 4,666,303 to Pryor discloses an electro-optical gap and flushness sensor that utilizes a laser light source to provide a highly directionalized source of light and focusing lenses to direct the light beam to the part surface to be tested. Moreover, the light reflected from the workpiece is refocused to form an image on a photo detector array. The photo detector array comprises a plurality of photosensitive cells, and the numerous cell outputs are then analyzed by a microcomputer using triangulation equations to determine the dimensional characteristics of the workpiece surface. While such a system may be fairly be accurate, the complexity of the illumination sources and the detecting apparatus renders such systems extremely expensive.

DISCLOSURE OF INVENTION

The present invention overcomes the abovementioned disadvantages by providing a low cost method and apparatus for measuring distances within a predetermined range of a probe housing with a simple light source and a simple photosensitive device. Preferably, both the source and the photosensitive device are mounted within the same housing to simply pre-align the illumination source with the photosensitive receiver and a shading structure, although separate pre-aligned sources and receivers could be used. In any event, a light source and a receiver are arranged in a predetermined relationship with respect to a shade that directs at least a portion of the light beam generated by the source to provide substantially linearly varying illumination intensity at the receiver throughout a predetermined range adjacent the sensor housing.

In one form of the invention, pre-aligned source and reception chambers provide substantially linearly varying beam area so that illumination intensity of light reflected from the workpiece is sensed at the receiver as the workpiece is positioned throughout the predetermined range relating to the probe. In another form, a shade in an enclosed housing is displaced between a light source and a receiver in response to the relative distance between the sensor housing and the workpiece. A wide variety of illumination sources can be utilized to provide a substantially linearly variable output directly corresponding to measurements detected within the predetermined range.

In one embodiment of the invention, a light beam emitted from a source chamber opening is directed toward an open housing face near an outer edge of a reception chamber containing a photosensitive cell such as a photovoltaic cell. As the distance to be measured approaches the innermost limit of the predetermined measuring range, substantially all of the light emitted is reflected from the workpiece into the reception chamber for detection by the photosensitive cell. Conversely, as the distance between the probe and the workpiece approaches the outermost limits of the range, substantially all of the light emitted from the source chamber opening is reflected from the workpiece outwardly from the reception chamber so it cannot be detected by the phototsensitive cell. At any position within the range, the housing serves as a shade so that intensity of the light detected by the photosensitive cell varies substantially linearly with the distance. As a result, the substantially linear output of the photosensitive cell provides corresponding indications of the distance between the workpiece surface and the sensor housing.

In another embodiment of the apparatus, the light emitted from a light source chamber opening is directed toward an area adjacent a receptor chamber opening by an intermediate wall. When the distance to be measured is at the nearest extreme of the predetermined range, substantially no light is reflected from the workpiece into the reception chamber opening for detection by the photosensitive cell. Conversely, at the outermost extreme of the range, the intermediate wall controls diffusion of the light emitted from the source chamber opening. As the light reflects from the workpiece, it is received by the reception chamber opening for detection by the photosensitive cell. In both of these embodiments, the probe housing is a non-contact probe housing because the sensor need not engage the workpiece throughout the predetermined range.

In another form of the invention, the probe housing is enclosed and carries a plunger which is supported for sliding movement within a predetermined range. Unlike the previously known resiliently biased stylus indicators, the plunger carries a shade while the housing carries a light source on one side of the shade and a photosensitive cell on the opposite side of the shade. As the plunger is displaced by contact with the workpiece, the intensity of the light directed to the receiver past the shade from the source is varies in direct proportion to the amount of displacement of the plunger.

These embodiments permit the practice of a method wherein a constant illumination intensity light source emits a beam from a source chamber opening which is directed to a barrier which effects a substantially linearly change of the light intensity transmitted to a photosensitive cell, whereby a substantially-linear variation in electrical output of the photosensitive cell correspondingly tracks the changes in distance from the sensor housing to the workpiece surface. Where the geometry of the probe, the workpiece or other components produces minor deviations from a linear response within the predetermined range, the present invention also includes appropriate means, such as computer software, for performing an extrapolation on the response or output signal, to provide direct correspondence between the output signal and the distance. The present invention also provides additional compensation for a light source whose illumination intensity may vary as a function of heat or other factors such as variations in power supply output. Moreover, the method of the present invention does not require precision lenses to provide a collimated light source as was previously required in known detectors, although it is to be understood that collimated light beams could be employed with the apparatus and method of the present invention.

Thus, the present invention provides a simple measuring probe constructions which are particularly effective in industrial manufacturing operations. For example, since the tolerance range of automobile body parts may be very small fractions of an inch, such as, several thousandths of an inch, probes operable within a predetermined range of about ¼" to ³⁄₁₆" can be employed in a production line for such parts. In particularly, a probe constructed in accordance with the present invention can be mounted by a conventional precision locating device such as a linear actuator for displacement to fixed measuring positions adjacent a workpiece station position when measurement of the part is required. The simplicity of the construction enables numerous detectors practicing the method of the present invention to be utilized economically within the production process. Accordingly, a large number of probes constructed in accordance with the invention could be inexpensively arranged in inter-related alignments for measurement of curvatures or other complex configurations. Furthermore, the invention avoids the need for separate gauging operations which previously required removal from the production lien for testing. Moreover, the invention avoids the need for the previously known complex optical sensing equipment used for gauging production or prototype workpieces. Nevertheless, the invention provides accurate dimensional measurement within several ten-thousandths of an inch inexpensively.

Accordingly, the present invention provides a low cost but highly accurate sensor for measuring dimensions within a predetermined range. The apparatus for practicing the method dan e simply constructed and does not require light collimating structures or numerous photosensitive devices as required in arrays for dimensional characteristic detection devices previously known. Furthermore, the present invention provides versatility in accommodating a wide variety of illumination sources, and the effects of environmental light can be minimized by selection of appropriate light, sources or filters. Furthermore, illuminating sources can be stabilized by sensor feedback circuits or the like to maintain consistent operation under changing environmental conditions. Additional details and advantages will be understood from the following detailed description.

BRIEF DESCRIPTION OF DRAWINGS

The present invention will be more clearly understood by reference to the following detailed description of a preferred embodiment when read in conjunction with the accompanying drawing in which like reference characters refer to like parts throughout the views and in which.

BEST MODES FOR CARRYING OUT THE INVENTION

Figure 1:
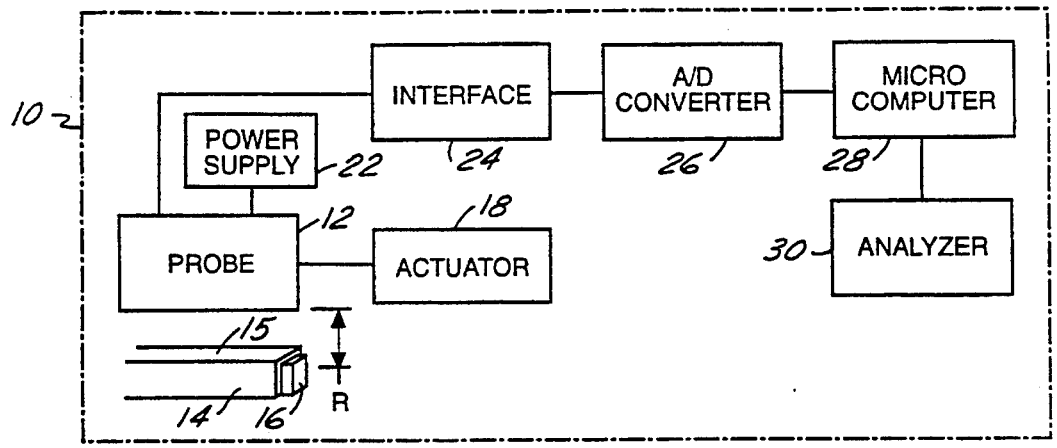
FIG. 1 is a diagrammatic view of the system incorporating a probe constructed in accordance with the present invention.

Referring first to FIG. 1, a measuring system 10 according to the present invention includes a probe 12 for measuring dimensional characteristics of a workpiece 14. The workpiece 14 is supported at a workpiece station 16 which may be a production line station or an independent gauging fixture as is well known in the art. In either event, the probe 12 is mounted for displacement to a predetermined position with respect to the workpiece 14 at the work station 16 by an actuator 18. The actuator 18 may be a conventional type such as a linear or a multi-axis displacement device, for example, a CNC motor, as diagrammatically shown at 18. The probe 12 includes an illumination source 23 (FIG. 2), such as a halogen bulb or LED, coupled to a power supply 22. In addition, the probe 12 includes photosensitive cells such as a photovoltaic cell 46 (FIG. 2) coupled to an appropriate interface 24 for conditioning the signal for use with the system 10. For example, the output of the interface 24 is coupled to an analog-to-digital converter 26 providing an output to a microcomputer 28 for operations as required by peripheral devices such as an analyzer 30. In any event, the actuator 18 displaces the probe 12 to a fixed position within a predetermined range R of the surface 15 on workpiece 14.

Figure 2:
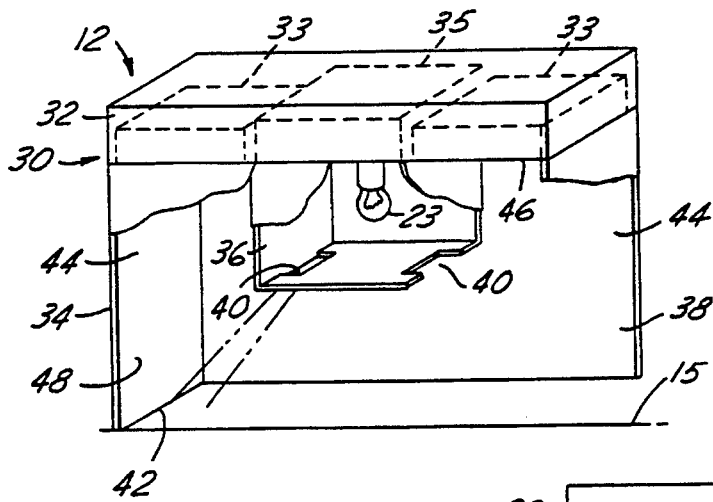
FIG. 2 is a fragmentary, perspective view of a probe constructed in accordance with the present invention and demonstrating a light beam emitted at one extreme of a predetermined range of measurement.

Referring now to FIG. 2, one form of probe 12 has a housing 30 including a top body 32 and a lower body 34. The upper body 32 forms a cover for the lower body and may include chambers as at 33 and 35 to receive electronic circuits or other components to be used in conjunction with the probe. The lower body 34 includes an illumination source chamber 36 defined by a peripheral wall which separates the source chamber 36 from the remaining interior chamber 38 within the lower body 34. The peripheral wall includes at least one opening 40 (two shown) for directing light emitted by the source 23 toward a predetermined position at the face 42 of the lower body 34. As shown in FIG. 2, the apertures 40 are cut into the bottom wall portion of the peripheral wall, and are aligned with the filament of the light source to direct a defined light beam toward an area adjacent end wall surface 48 as will be discussed hereinafter.

As also shown in FIG. 2, lower body 34 also includes at least one reception chamber 44 (two shown). Photosensitive cells such as the photovoltaic cells 46 are supported at the top of each chamber 44. The interior surface 48 of each reception chamber 44 toward which the light is directed by the emission opening 40 may include a reflective coating such as a white paint. The remaining walls within the chamber 38 are coated with a dark or light absorbing material such as a dark felt. As a result, only light reflected against the end wall surface 48 can be further reflected toward the cell 46 in the reception chamber 44. The remaining walls limit the amount of the ambient light which can interfere with the light reflected against the photosensitive cell 46.

Still referring to FIG. 2, it will be understood that the face 42 of the lower body 34 is placed at or near the surface 15 of the workpiece 14. In addition, the light emission openings 40 direct the light beam from the source 23 toward an area adjacent the end wall 48 so as to impinge only upon the surface 15 of the workpiece 14. Accordingly, substantially all of the light within the directed beam reflects upwardly from the surface 15 toward the chamber 44 and photovoltaic cell 46. In the case of an incandescent bulb 23, directing of the light beam is best accomplished by limiting the opening to a fixed relationship with respect to the housing dimensions and by aligning the filament of the bulb in parallel relationship to the elongated opening 40. For example, an elongated slit ½ the width of the housing face 42 and aligned along the width of the housing, at a height from the face 42 equal to the housing width, was employed in actual testing.

Figure 3:
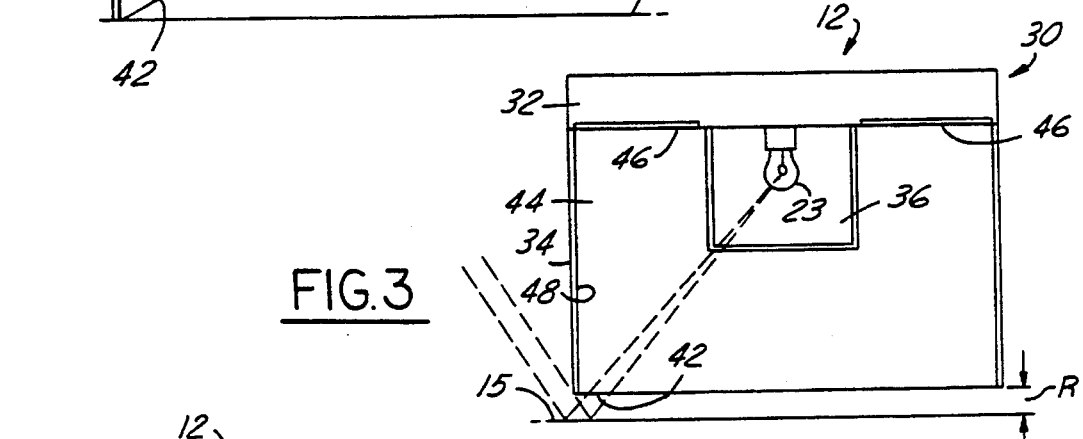
FIG. 3 is a sectional view of the probe housing in FIG. 2 but showing the probe at the opposite extreme of a predetermined range of sensitivity.
Figure 10:
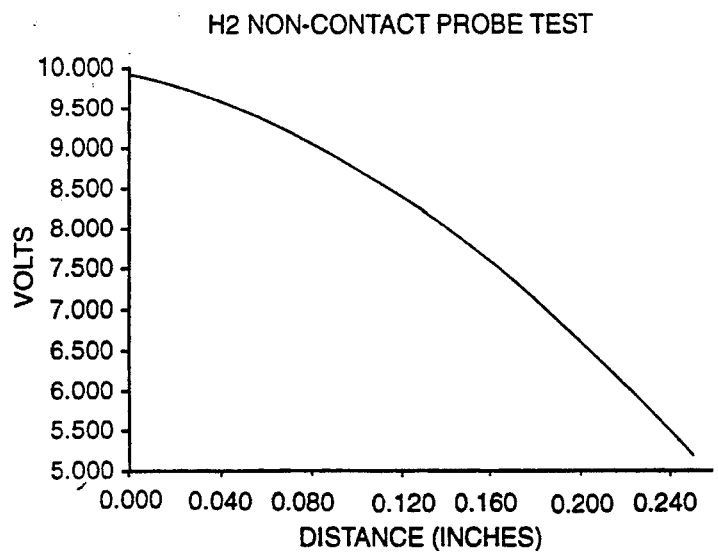
FIG. 10 is a graph illustrating the performance of a probe as shown in FIGS. 2–4.
Figure 11:
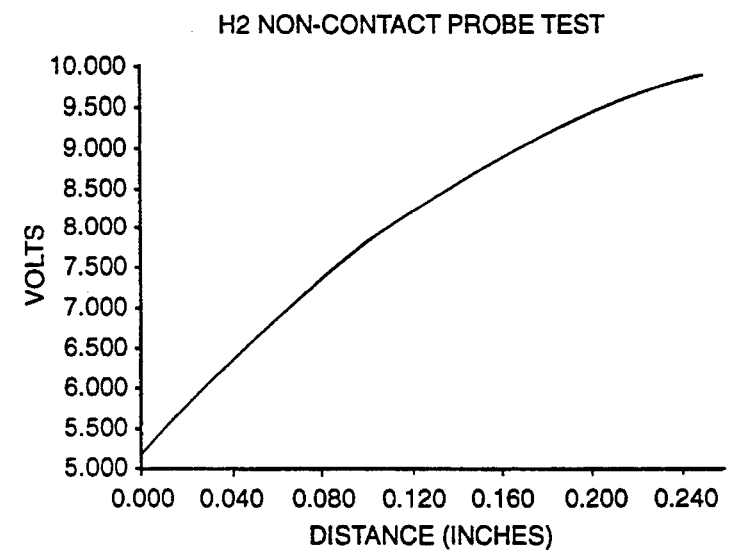
FIG. 11 is a graph illustrating performance of a probe constructed in accordance with FIG. 5.
Figure 16:
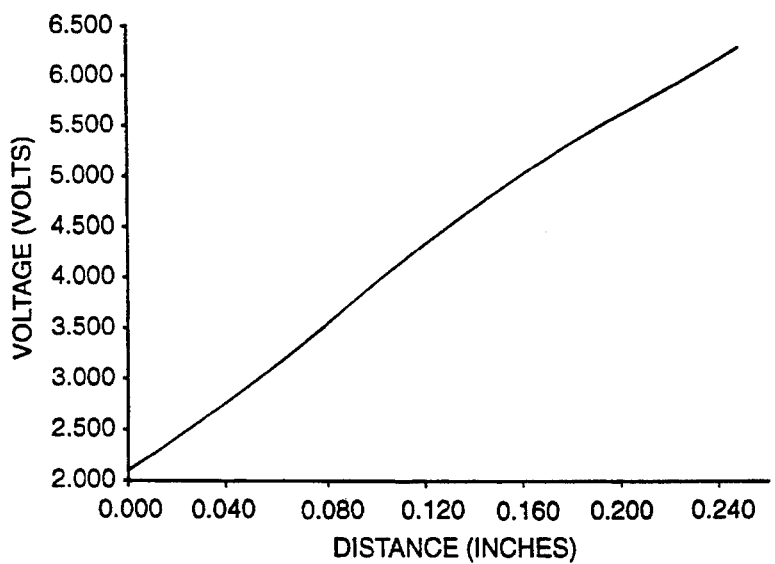
FIG. 16 is a graph illustrating performance of a probe construction in accordance with FIGS. 12 and 13.

As shown in FIG. 3, increasing the distance between the face 42 and the surface 15 permits more of the light beam emitted from the emission opening 40 to reflect outwardly from the reception chamber 44. At the outermost edge of the predetermined range R, the directed beam illuminates an area of the surface 15 at which substantially all of the beam is deflected outwardly from the reception chamber 44. The performance of the device is represented in FIG. 10, and will be discussed in greater detail hereinafter.

Figure 4:
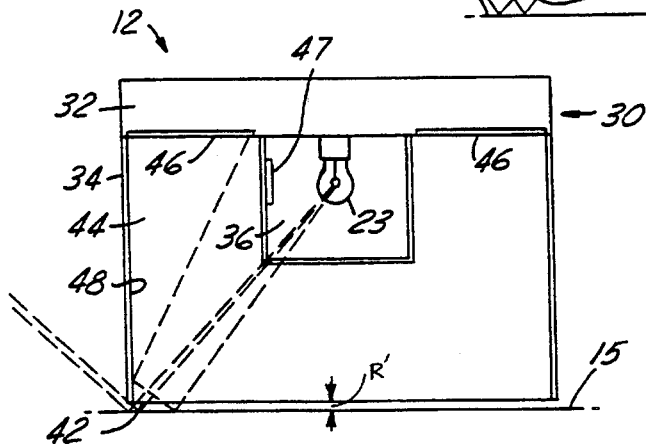
FIG. 4 is a sectional view similar to FIG. 3 but showing the probe at an intermediate position in the predetermined range.

As shown in FIG. 4, the range R may be displaced from the face 42 depending upon the direction of the beam emitted toward the workpiece 14. The direction may be adjusted by the shape or position of the opening 40, including its alignment with the source 23. In addition, if an incandescent bulb or halogen bulb is used as the illumination source, the opening 40 should be in the form of an elongated slit aligned with the filament of the bulb. Of course, it is to be understood that other light sources can also be used. In particular, the use of an infrared light source, and an appropriate filter over the opening of the reception chamber 44, would reduce interference with operation of the probe due to ambient light at the work station 16. In any event, the embodiment assures that the light intensity falling upon cell 46 is a function of the distance between source 23 and surface 15 of workpiece 14. This is the case because the change in the intensity of the light falling upon cell 46 is a function of the change in beam area impinging upon the workpiece surface, if other factors such as beam intensity, the beam width and the area of the cell 46 are each constant.

Figure 5:
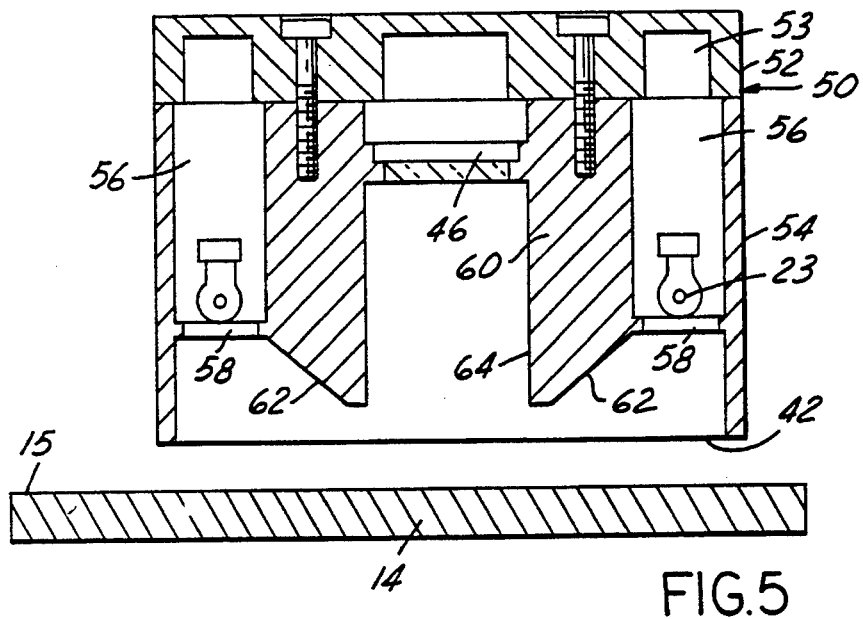
FIG. 5 is a sectional view of a probe housing showing a further modification according to the present invention.

Referring now to FIG. 5, a probe 12 constructed with a housing 50 is thereshown comprising an upper body 52 and a lower body 54. Like the upper body 32, the upper body 52 covers the lower body and may include chambers as at 53 for electronic circuits or accessories. The lower body 54 houses a pair of illumination source chambers 56 and a central reception chamber 64. The photosensitive cell 46 is supported above the reception chamber 64. An illumination source 23 is positioned above a protective lens 58 in each source chamber 56. Each source chamber 56 is separated from the reception chamber 64 by a barrier wall 60. Each barrier wall 60 terminates short of the face 42 of the housing 50. Barrier wall include includes a sloping face 62 directing the light from the source chamber 56 toward the face 42 adjacent the reception chamber 64.

With the workpiece surface 15 adjacent the face 42, the barrier wall 60 limits the spread of the emitted light beam from the source 23 so as to cast a shadow or darkened area on the surface 15 adjacent the open end of the reception chamber 64. As the housing 50 is displaced further away from the surface 15, as shown in phantom line in FIG. 5, the shadowed area adjacent the opening of the reception chamber 64 is reduced as the beam illuminates more of the surface 15 adjacent the opening of the reception chamber 64. Preferably, the limit of the predetermined range R is reached when the edges of the light beam directed from each illumination source chamber meet at the center of the reception chamber 64 on the surface 15 of workpiece 14. Beyond the limit of the range R, the directed beams from each of the illumination sources 23 overlap on the surface 15 of the workpiece 14, and the ambient light reflected from adjacent areas of the workpiece may begin to affect the illumination intensity sensed by the photosensitive cell 46.

Figure 6:
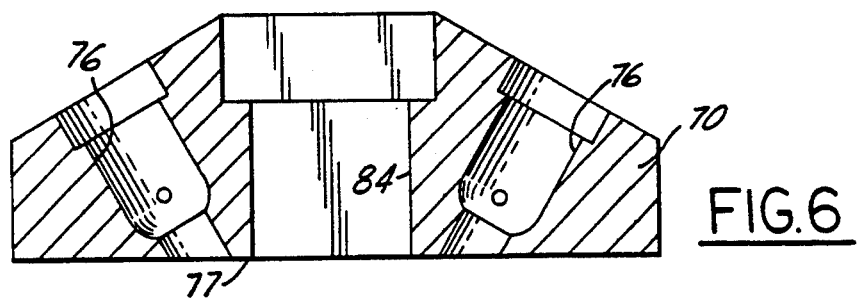
FIG. 6 is a sectional view of a probe showing a further modification according to the present invention.
Figure 7:
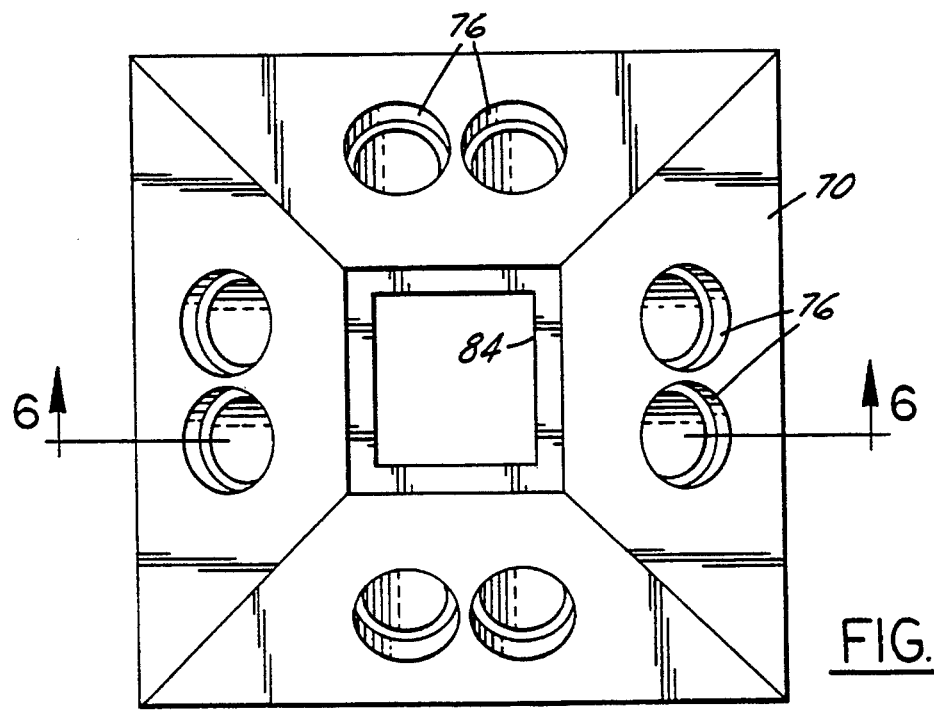
FIG. 7 is a top plan view of the sensor housing shown in FIG. 6.

Referring now to FIG. 6, a housing 70 includes a plurality of illumination chambers 76 and a reception chamber 84. Each of the illumination chambers is aligned at an angle with respect to the axis of the reception chamber 84. As with the embodiment shown in FIG. 6 having a 60° angle between the plurality of chambers 76 and the face 42, the wall 77 casts a shadow adjacent the opening of the common reception chamber 84 when the workpiece surface 15 is in close proximity to the face 42 of the housing 70. As the surface 15 is displaced from the face 42 within the range R, the shadow on the surface 15 adjacent the opening in the reception chamber 84 dissipates uniformly so as to substantially linearly vary the light intensity which reaches the photosensitive cell 46 at the top of the reception chamber 84. As shown in FIG. 7, the plurality of illumination source chambers 76 surround a common reception chamber 84. Each source chamber 76 is particularly shaped to receive a LED envelope. For example, a Radio Shack 276143A includes a glass envelope forming a lens which focuses a beam of light, and the illumination chamber directs the beam toward a desired angle. By increasing the intensity of light directed against the workpiece 14, the light intensity at any particular distance within the range R will be large enough to counteract the effect of ambient illumination reflected upon surfaces of the workpiece 14.

Figure 8:
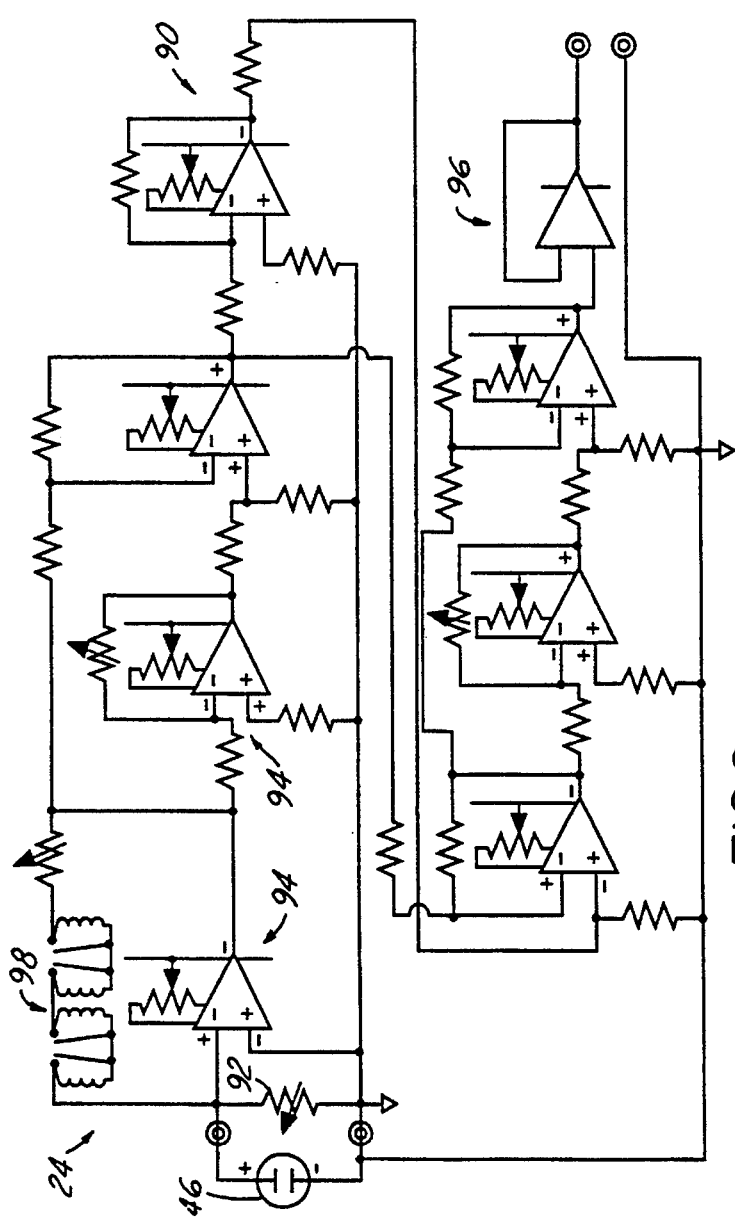
FIG. 8 is a schematic diagram of an interface circuit constructed according to the present invention.

Referring now to FIG. 8, an interface circuit 90 is thereshown including the photosensitive cell 46. It will be noted that the photosensitive cell 46 is shunted by a resistor 92 to provide a voltage drop that permits the current to vary substantially linearly to the intensity of light illumination impinging upon the photosensitive cell 46. The voltage is then amplified through a series of inverting amplifiers 94 and a buffer 96 to improve signal strength for further processing such as inputting to the analog-to-digital converter. The gain may e adjusted by a switching circuit 98.

The interface circuit as shown in FIG. 8 may be housed in the probe 12. For example, the upper body 32 of the housing 30 may include a circuit chamber 33 (FIG. 2) for housing such circuitry. In any event, generated voltage output signals in the range of 2–10 volts are preferred for further processing of signals corresponding to the changes in illumination intensity reaching the photosensitive cell 46. Nevertheless, more recent developments in photosensitive cells permit such voltages to be obtained without an interface circuit, and this may be avoided without departing from the present invention.

Figure 9:
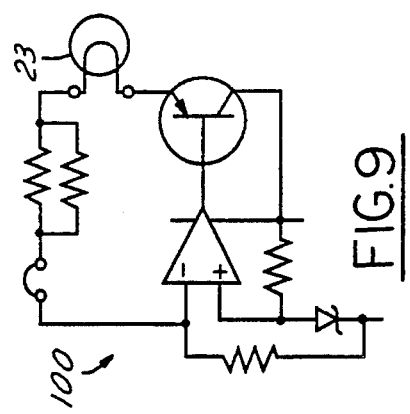
FIG. 9 is a circuit diagram for a constant current power supply for the illumination source.

FIG. 9 discloses a power supply circuit 100 for use in illuminating the illumination source 23. Such a circuit provides a constant current to the illuminating source and compensates for variations in generated voltage from a conventional a power source. By maintaining a substantially constant current to the light source, the reaction of the photosensitive cell becomes more dependent on the distance-sensitive direction of the beam. A reference photosensitive cell 47 (FIG. 4) in the source chambers 36 or 56 may also provide a feedback signal to the power supply for the source.

Figure 14:
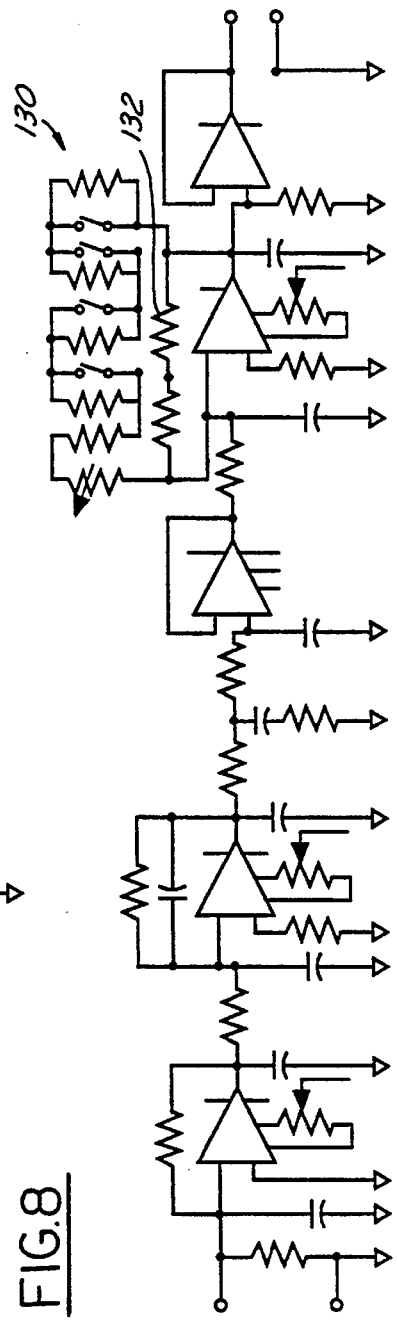
FIG. 14 is a schematic view of a feedback circuit for use with a probe of the present invention.

A feedback circuit 130 is shown in FIG. 14 for adjusting the output from the photosensitive cell when temperature affects the intensity of light emitted from the source.

Although similar to the interface circuit 90 of FIG. 8, the circuit 130 includes an additional heat sensitive device such as a thermistor to compensate for heat build-up. In this embodiment, resistor 132 is used in a feedback loop to compensate for heat build-up at the illumination chamber. Such a circuit can also be carried in the probe housing in an appropriate chamber such as 35 (FIG. 2) where the sensor 47 and the resistor 132 can be positioned in close proximity to the illumination chamber 36. Such a feature compensates for heat, such as the increased heat retained in the housing when the workpiece is very close to the probe.

Figure 13:
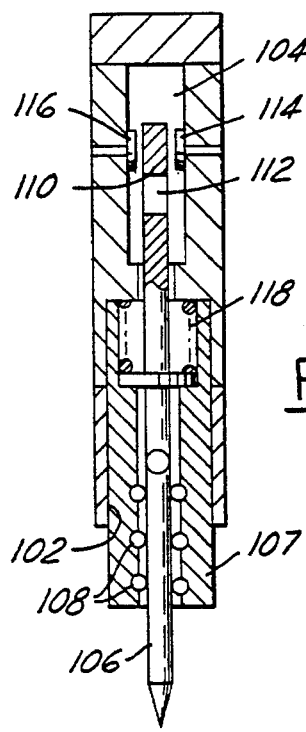
FIG. 13 is a side sectional view of the probe shown in FIG. 12.

Referring now to FIGS. 13 and 13, a probe 12 having a sensor housing 101 is thereshown having an aperture 102 communicating with an internal chamber 104. A contact plunger 106 is slidably entrained in the opening by a housing 107 including ball bearings 108 for supporting the plunger 106. The plunger 106 is resiliently biased toward and outermost position representing the outermost extreme of the range R by a spring 118 carried in the housing 107. The innermost end of plunger 106 carries a shade 110 having an aperture 112. The housing 101 carries a light source 114 such as an infrared emitting diode. For example, TRW TIL632, on one side of the chamber 104 and a photosensitive cell 116 such as a Vactec VTS 3014 on the other side of the chamber 104. Since the source and the receiver are on opposite sides of the shade 110, no light is transmitted to the sensor unless directed through the aperture 112.

Figure 12:
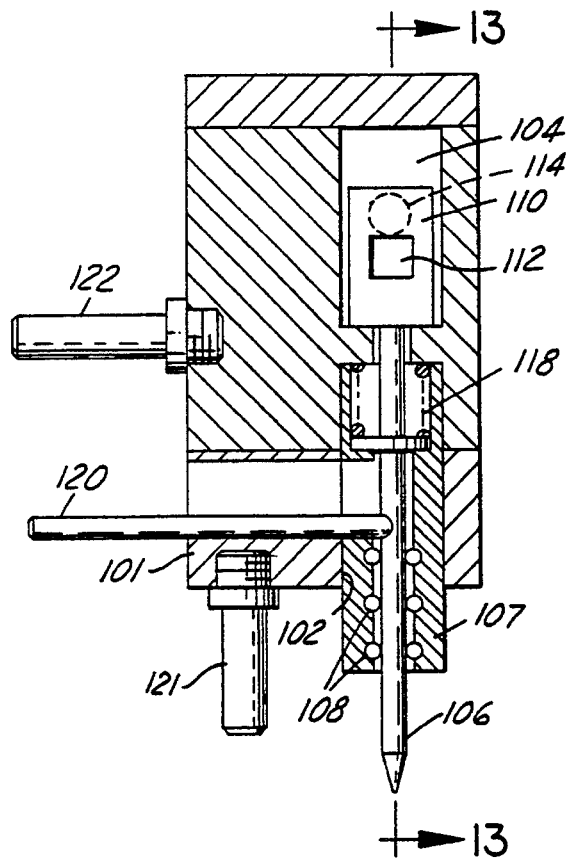
FIG. 12 is a sectional view of a further probe construction in accordance with the present invention.

In addition, other types of probe ends such as a gap insertion prong 120 may be coupled to the plunger 106 so that the distance between a housing portion, such as a fixed mounting pin 122 on the housing, and the plunger mounted prong 120 can be readily measured. Furthermore, the aperture shape or shade shape may be varied to provide changes in the illumination intensity as needed for condition compensation, although the square aperture shown in FIG. 12 is preferred in the direct alignment of source and receiver shown in the figure.

Figure 15:
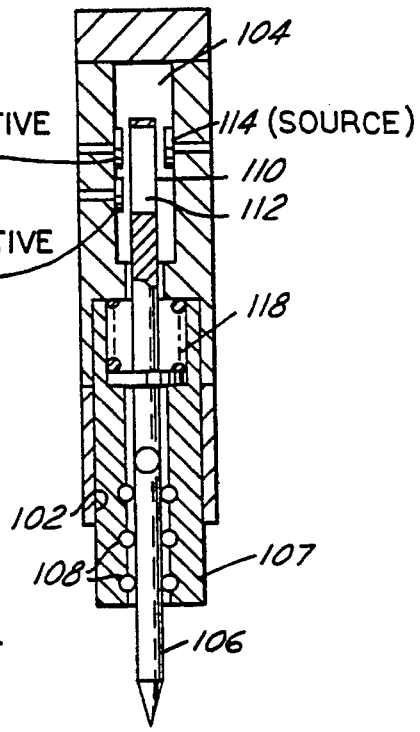
FIG. 15 is a side sectional view similar to FIG. 13 but showing a further modification of the probe construction.

As shown in FIG. 15, the contact probe may include additional photosensitive cells in alignment with the source 114 through the aperture 112. The photosensitive cell 117 may be used as a reference cell. Accordingly, while the receiver photosensitive cell 116 becomes shaded by the shade 110 as it is displaced in the longitudinal direction of the plunger 106, the cell 117 remains exposed to the source through the enlarged aperture 112. As a result, any change of light intensity due to variation of intensity at the source 114 will be detected apart from the variation occurring at the cell 116. The additional output from the cell 117 can then be used as a feedback control to compensate for and eliminate variations due to inconsistent power or other interference with constant light intensity emitted from the source.

Having thus described important structural features of the present invention, the practice of the method according to the present invention is easily described. The probe in either contact or non-contact form is positioned at a fixed position within a predetermined range of the workpiece surface to be gauged. The light source 23 emits a light beam in the probe, and the hosing or other shade directs the beam so that it variably shades the beam in response to the relative distance between the probe and the workpiece. The photosensitive cell then senses a predetermined portion of the shaded beam, whereby the illumination intensity at the receiver varies substantially linearly throughout the predetermined range. As a result, the distance of a workpiece surface from the probe is represented by a directly corresponding signal.

Preferably, constant illumination intensity of the light source is maintained, and the alignment between the emitted beam and the receiver directs the light beam to substantially linearly change the light intensity directed to the receiver. The linear change in illumination intensity may be applied to both reflected beams as well as directly emitted beams. In either event, the light intensity at the receiver is made directly proportional to the distance of the workpiece from the probe housing by maintaining the width of the beam directed to the receiver and varying only a limited dimension of the beam as a function of distance. In particular, it may be appreciated that the beam area's length on a reflecting surface to the barrier is related to the distance from the probe by the tangent of the angle at which the beam is directed to the surface. Preferably, the light intensity emitted, the light intensity reflected by a particular type of workpiece, and the area of the receiver, remaining constant to satisfy the constant relationship between intensity and distance, although compensation for variations of these factors are also within the scope of the invention. As a result, then intensity of the light impinging upon the photosensitive cell directly corresponds with the distance between the sensor housing and the workpiece. Accordingly, the substantially linearly variable output from the photosensitive cell provides directly corresponding electrical signals as a function of the distance of the workpiece surface from the sensor housing.

Having thus described the present invention, many modifications thereto will become apparent to those skilled in the art to which it pertains without departing from the scope and spirit of the present invention as defined in the appended claims.

It is claimed:

1. A non-contact measurement probe for determining distance between the probe and a workpiece, comprising:

a housing having a top body and sidewalls extending from said top body and said sidewalls terminating in an edge portion, said sidewalls and said top body defining a housing interior chamber, a light source residing within said housing interior chamber, means for directing light emanating from said light source to a location adjacent an edge portion of at least one of the said sidewalls, a photo sensitive cell mounted within said housing interior chamber for receiving light reflected from said at least one of said sidewalls, whereby said workpiece is placed adjacent said edge portion of said at least one of said sidewalls and said photo sensitive receiver is sensitive to said light reflected from said workpiece and onto said at least one of said sidewalls.

2. The probe of claim 1, wherein said light source is maintained at a constant illumination intensity.

3. The probe of claim 2, wherein said means for directing light includes a housing surrounding said light source having at least one opening therein.

4. The probe of claim 3, wherein said light source is an incandescent light source having a filament therein and said opening in said light directing means is aligned in parallel with said filament.

5. The probe of claim 1, wherein at least one of said sidewalls includes a light reflective surface, and said remaining sidewalls include light absorbing surface.

6. A non-contact measurement probe for determining distance between the probe and a workpiece, comprising:

a housing having a top body and sidewalls extending from said top body and terminating in an edge portion, said sidewalls defining a housing interior chamber, a light source, residing in said interior chamber, for emitting light onto a workpiece a photo sensitive cell, residing in said interior chamber, chamber, and responsive to said light emitted onto said workpiece a barrier wall separating said light source and said photo sensitive cell, wherein at least one of said sidewalls is effective for reflecting light from said workpiece onto said photo sensitive cell, wherein the intensity of said light reflected onto said photo sensitive cell is a function of the distance between the probe and the workpiece.

7. The probe of claim 6, wherein said edge portions of said housing sidewalls terminate in a common plan and said barrier wall includes an end portion terminating in a plane spaced apart from said common plane.

8. The probe of claim 6, wherein said barrier wall generally surrounds said photo sensitive cell forming a reception chamber.

9. The probe of claim 8, wherein said reception chamber has a central axis and said light emanating from said light source is inclined toward said central axis.

10. The probe of claim 9, wherein said inclination is generally sixty degrees.

\* \* \* \* \*

UNITED STATES PATENT AND TRADEMARK OFFICE
CERTIFICATE OF CORRECTION

PATENT NO. : 5,469,249
DATED : 11/21/95
INVENTOR(S) : Magyar, Jr. et al

It is certified that error appears in the above-indentified patent and that said Letters Patent is hereby corrected as shown below:

In claim 6, column 10, line 45, please delete "chamber,".

Signed and Sealed this

Fifth Day of March, 1996

Attest:

BRUCE LEHMAN

*Attesting Officer*  *Commissioner of Patents and Trademarks*